United States Patent
Palm et al.

(10) Patent No.: US 9,521,270 B1
(45) Date of Patent: Dec. 13, 2016

(54) CHANGING IN REAL-TIME THE PERSPECTIVE OF OBJECTS CAPTURED IN IMAGES

(71) Applicant: Google Inc., Mountain View, CA (US)

(72) Inventors: Leon Palm, Santa Monica, CA (US); Liviu Panait, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/142,673

(22) Filed: Dec. 27, 2013

Related U.S. Application Data

(60) Provisional application No. 61/823,221, filed on May 14, 2013.

(51) Int. Cl.
*H04N 1/00* (2006.01)

(52) U.S. Cl.
CPC ...... *H04N 1/00082* (2013.01); *H04N 1/00005* (2013.01); *H04N 1/00076* (2013.01); *H04N 1/00702* (2013.01); *H04N 1/00721* (2013.01)

(58) Field of Classification Search
None
See application file for complete search history.

(56) References Cited

U.S. PATENT DOCUMENTS

| | | | |
|---|---|---|---|
| 6,233,060 B1 * | 5/2001 | Shu | G06T 5/20 358/1.9 |
| 7,593,595 B2 * | 9/2009 | Heaney et al. | 382/276 |
| 8,897,565 B1 * | 11/2014 | Palm | G06K 9/3275 382/176 |
| 2006/0119614 A1 * | 6/2006 | Fukui | G06T 11/001 345/611 |
| 2011/0125561 A1 * | 5/2011 | Marcus | 705/14.15 |
| 2011/0216939 A1 * | 9/2011 | Woo | G06K 9/00 382/103 |
| 2012/0218444 A1 | 8/2012 | Stach | |

OTHER PUBLICATIONS

"Credit Card Processing Using Cell Phone Images" to Datta, Keshav, Jul. 23, 2012.*
Non Patent Literature "Credit Card Processing Using Cell Phone Images" to Datta, Keshav, Jul. 23, 2012.*
Trans-Code Design, Webpage for "Droid Scan: Document Scanning for Mobile," 2013, 2 Pages, [online] [Retrieved on Aug. 22, 2014] Retrieved from the internet <URL:http://droidscan.com/>.
Cozma, N., "How to scan documents with Android devices," Feb. 2, 2012, CNET, 12 Pages, [online] [Retrieved on Aug. 22, 2014] Retrieved from the internet <URL:http://howto.cnet.com/8301-11310_39-57370087-285/how-to-scan-documents-with-android-devices/>.

(Continued)

*Primary Examiner* — Christopher D Wait
(74) *Attorney, Agent, or Firm* — Fenwick & West LLP

(57) ABSTRACT

Capturing an image of an object from a captured perspective and creating a plurality of candidate object areas. Each candidate object area potentially enclosing the object captured in the image. From the plurality of candidate object areas, a candidate object area is selected as enclosing the object. A corrected image of the object is generated based on the selected candidate object area. The corrected image shows the object transformed to a corrected perspective. The corrected image is displayed.

13 Claims, 6 Drawing Sheets

(56) References Cited

OTHER PUBLICATIONS

Silverman, M., "5 Android Apps to Turn Your Phone Into a Mobile Document Scanner," Mashable, Sep. 3, 2011, 5 Pages, [online][Retrieved on Aug. 25, 2014] Retrieved from the internet <URL:http://mashable.com/2011/09/03/android-apps-document-scanner-pdf/>.
The Grizzly Labs, Webpage for "The Grizzly Labs—Genius Scan," 2014, 4 Pages, [online] [Retrieved on Aug. 22, 2014] Retrieved from the internet <URL:http://thegrizzlylabs.com/>.
Kleinberg, L., "Scanning Text with Your Smartphone," Mobilzed, UCSF Library, Apr. 18, 2012, 5 Pages, , [online] [Retrieved on Aug. 22, 2014] Retrieved from the internet <URL:http://blogs.library.ucsf.edu/mobilized/2012/04/18/scanning-text-with-your-smartphone/>.
Rodriguez-Pineiro, J., et al., "A new method for perspective correction of document images," University of Vigo, SPIE 2011, 12 Pages, Can be retrieved at <URL:http://www.gts.tsc.uvigo.es/gpsc/publications/wmark/spie-2011.pdf>.

* cited by examiner

CHANGING IN REAL-TIME THE PERSPECTIVE OF OBJECTS CAPTURED IN IMAGES

CROSS-REFERENCE TO RELATED APPLICATIONS

This application claims the benefit of provisional application 61/823,221, filed on May 14, 2013, which is incorporated by reference herein in its entirety.

BACKGROUND

1. Field of the Embodiments

The embodiments pertain in general to capturing images, and more specifically to changing in real-time the perspective of objects captured in images.

2. Description of the Related Art

Due to the popularity of mobile devices (e.g., mobile phones and tablets), mobile devices are being used by users for more and more purposes. One way in which mobile devices are being used is to take photographs of real world physical documents for purposes of creating digital copies of the documents. Typically the captured images are low quality renditions of the documents and as a result some type of image processing needs to be performed on the images. Therefore, a user is unable to assess the quality of the image until it is captured and processed. This prevents the user from being able to determine which actions to take prior to the image being captured that will improve the quality of the image, such as adjusting background lighting.

BRIEF SUMMARY

Methods, devices, and computer program products are described for processing images. Embodiments of the method comprise capturing an image of an object from a captured perspective. A plurality of candidate object areas in the captured image are created. Each candidate object area potentially encloses the object captured in the image. From the plurality of candidate object areas, a candidate object area is selected as enclosing the object. A corrected image of the object is generated based on the selected candidate object area. The corrected image shows the object transformed to a corrected perspective. The corrected image is displayed.

Embodiments of the devices comprise one or more imaging components, a processor, and a non-transitory computer-readable storage medium. The one or more imaging components are configured to capture an image of an object from a captured perspective. The non-transitory computer-readable storage medium stores program modules adapted to execute on the processor. The program modules comprise an area module configured to create a plurality of candidate object areas in the captured image. Each candidate object area potentially encloses the object captured in the image. A selection module is configured to select from the plurality of candidate object areas, a candidate object area that encloses the object. A scan module is configured to generate a corrected image of the object based on the selected candidate object area. The corrected image shows the object transformed to a corrected perspective. The scan module displays the corrected image.

Embodiments of the computer program product have a non-transitory computer-readable storage medium having computer-executable instructions. The computer program product comprises an area module configured to create a plurality of candidate object areas in the captured image. Each candidate object area potentially encloses the object captured in the image. The computer program product further comprises a selection module configured to select from the plurality of candidate object areas, a candidate object area that encloses the object. The computer program product further comprises a scan module configured to generate a corrected image of the object based on the selected candidate object area. The corrected image shows the object transformed to a corrected perspective. The scan module displays the corrected image.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1A:
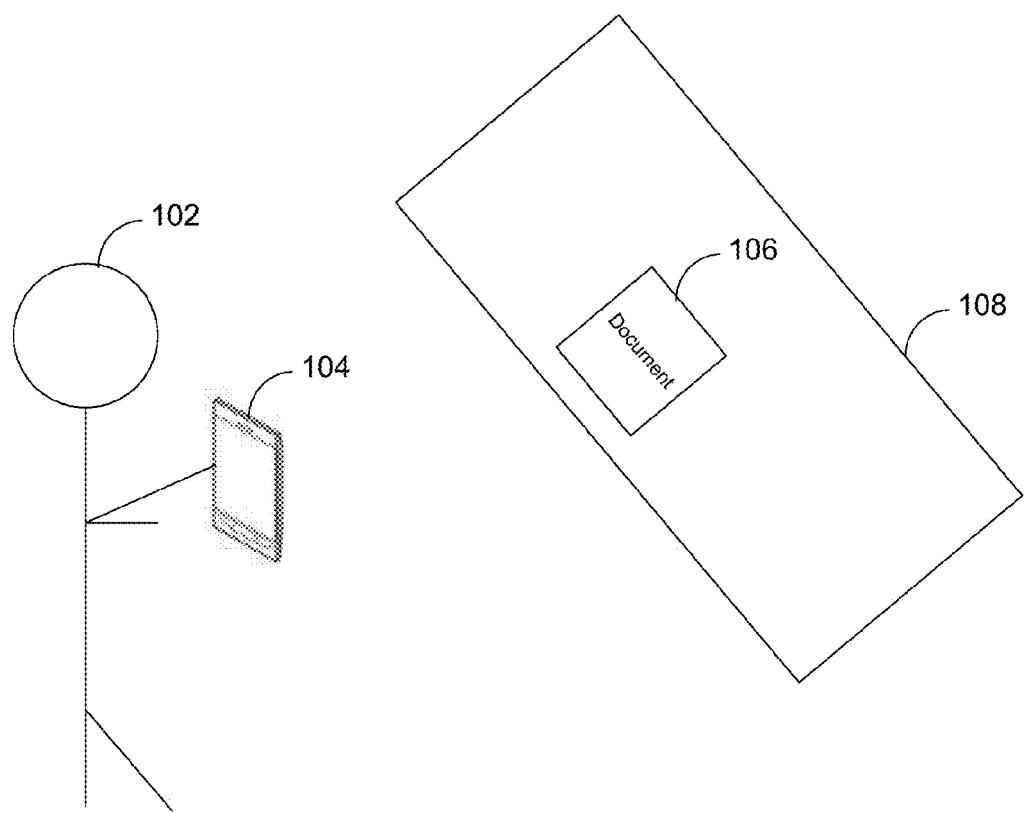
FIGS. 1A-1C illustrate examples of capturing an image according to one embodiment.

FIG. 1A illustrates an example of a user 102 using an image capturing device 104, such as a mobile phone or tablet computer with a built-in camera, to capture an image of a document object 106. In this example, the object 106 is a rectangular document laying on top of a table 108 and the user 102 is near the table 108. The object may be different in other examples. As an example, the object may be a business card, photograph, note, book, etc. The user 102 uses the image capturing device 104 to capture the image of the object 106 from a captured perspective that reflects the position and orientation of the image capturing device 104 relative to the position and orientation of the object.

Figure 1B:
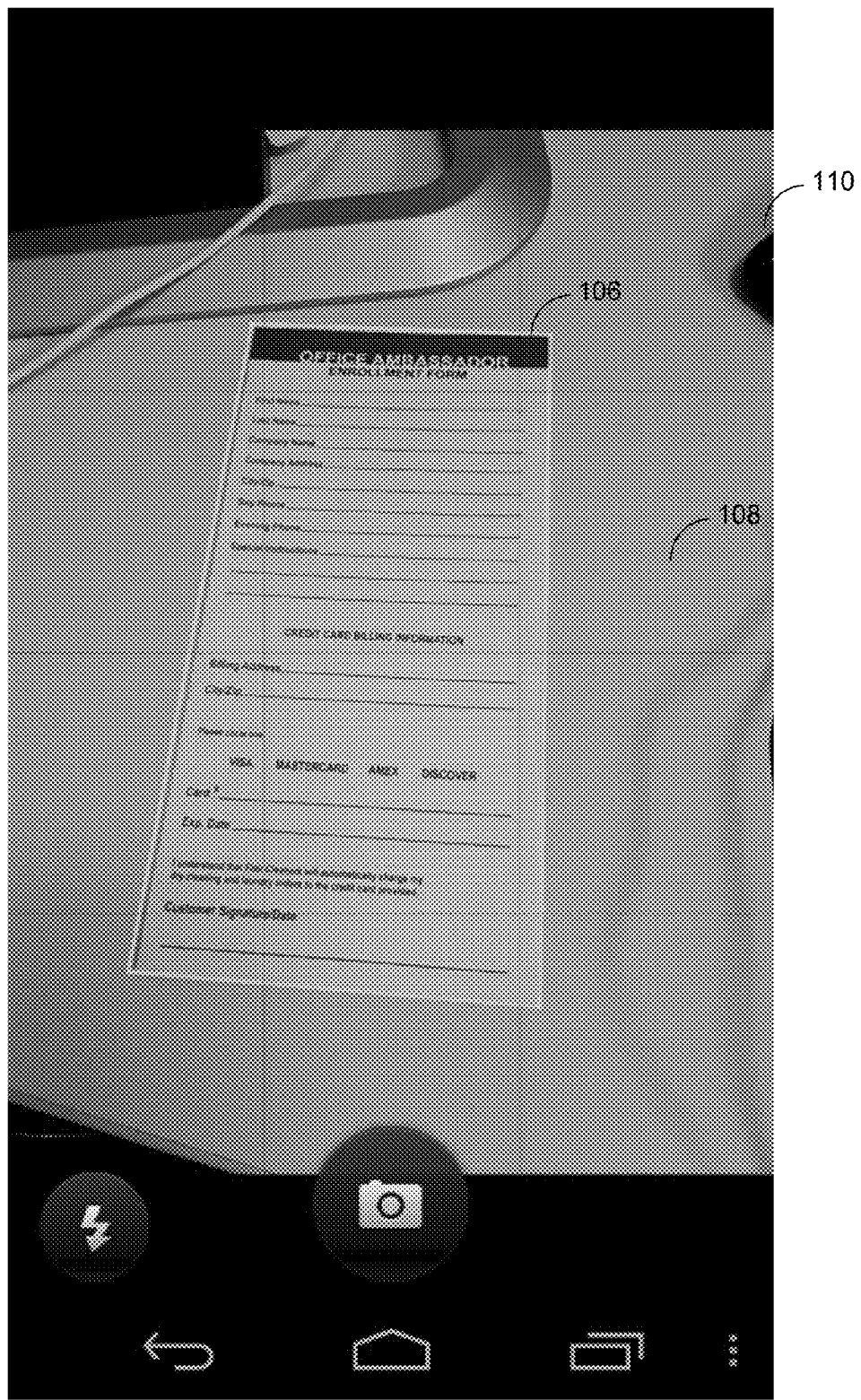

FIG. 1B illustrates an example of an image 110 of the object 106 captured by the image capturing device 104 from the captured perspective. As can be seen, the captured image 110 shows the object 106 from a perspective above and adjacent to the object 106. Thus, the object 106 in the image 110 is distorted due to the perspective. For example, the bottom edge of the document 106 appears longer than the top edge, and the side edges of the document 106 are not parallel, due to the bottom edge being closer to the image capturing device 104.

In one embodiment, the image capturing device 104 performs image processing on the captured image to remove the perspective distortion from the image. The processing produces a corrected image that shows the object 106 rectified to a fronto-parallel plane. In other words, the corrected image shows the object 106 from a perspective that would be obtained if the image capturing device 104 were held directly in front of (e.g., above), and parallel to, the object. The corrected image thus shows the object 106 as if it were imaged by a flatbed or other form of dedicated scanner. This new perspective of the object 106 is referred to as the "corrected," "scanned," or "rectified" perspective.

Figure 1C:
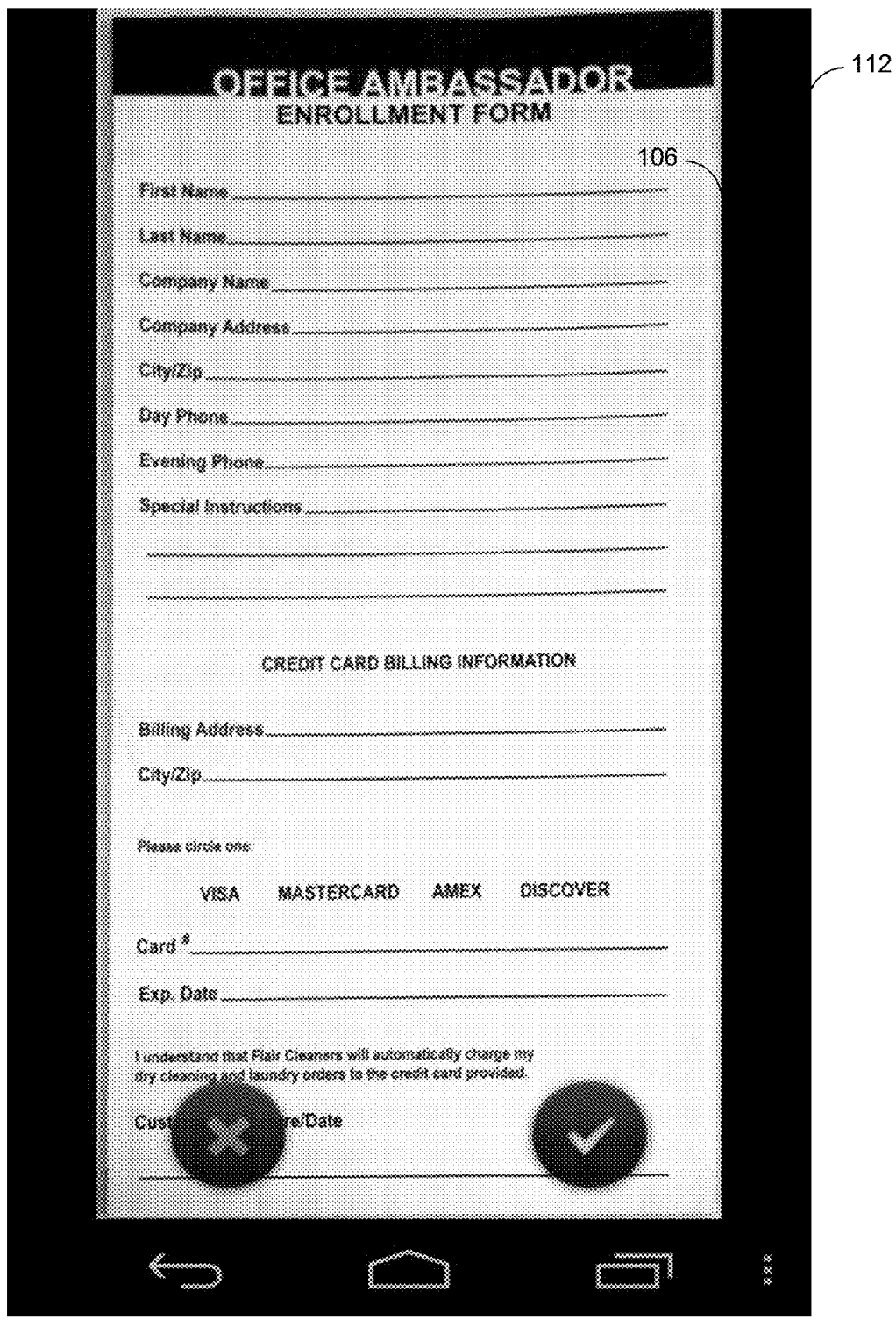

FIG. 1C illustrates an example of the corrected image 112 produced by the image capturing device 104. The processing has transformed the image of the document 106 from the captured perspective to the corrected perspective. FIG. 1C shows the object 106 (i.e., the document) in the fronto-parallel plane. The document 106 is rectangular; the top and bottom edges have the same length and the side edges are parallel.

In one embodiment, the image capturing device 104 is continuously capturing images and processing the images in real-time to update the corrected image that is displayed to a user. By processing the images in real-time it allows the user to view an object in the corrected perspective while changing the captured perspective. Said another way, the user can see the end result of the image processing while moving the image capturing device 104 over the object. From the user's point of view, he is viewing a live feed of the object through the device 104 but from the corrected perspective. By viewing the corrected image through the device 104, the user may take certain actions to improve the quality of the corrected image. For example, the user may adjust the lighting in the image or change the position of the image capturing device 104 while viewing the corrected image in order to identify adjustments that maximize the quality of the corrected image. At any time, the user can request to store a corrected image that he is viewing.

Figure 2:
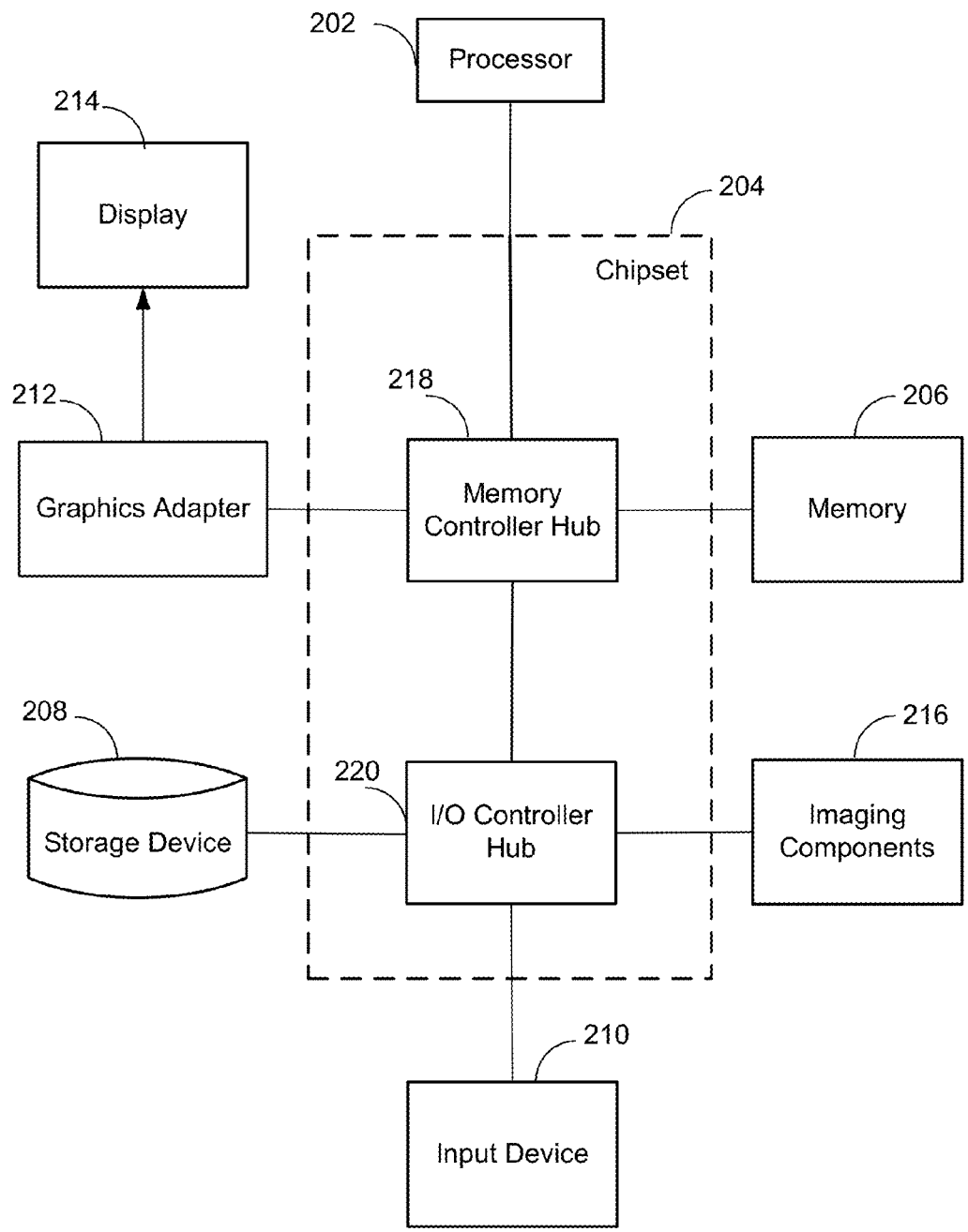
FIG. 2 is a high-level block diagram illustrating a functional view of an image capturing device according to one embodiment.

FIG. 2 is a high-level block diagram illustrating a functional view of the image capturing device 104 according to one embodiment. The image capturing device 104 has the capabilities to capture an image and record the image on a storage medium. The image capturing device 104 may be, for example, a mobile phone, a tablet computer, a camera, a personal computer, or a personal digital assistant (PDA).

In one embodiment, the image capturing device 104 includes at least one processor 202 coupled to a chipset 204. Also coupled to the chipset 204 are a memory 206, a storage device 208, an input device 210, a graphics adapter 212, and one or more imaging components 216. A display 214 is coupled to the graphics adapter 212. In one embodiment, the functionality of the chipset 204 is provided by a memory controller hub 218 and an I/O controller hub 220. In another embodiment, the memory 206 is coupled directly to the processor 202 instead of the chipset 204.

The storage device 208 is a non-transitory computer-readable storage medium, such as a hard drive or a solid-state memory device. The memory 206 holds instructions and data used by the processor 202. The input device 210 is a device configured to provide user inputs to the chipset 204 or processor 202, such as a cursor controller or a keyboard. In one embodiment, the input device 210 includes an alpha-numeric input device, such as a QWERTY keyboard, a key pad or representations of such created on a touch screen. In one embodiment, the input device 210 is a user input device equipped to communicate positional data as well as command selections to the chipset 204 or processor 202, such as a trackball, a stylus, a pen, a touch screen, cursor direction keys or other mechanisms to cause movement adjustment of an image.

The graphics adapter 212 displays images and other information on the display 214. The imaging components 216 are configured to capture images of objects. The imaging components 216 may include, for example, one or more of the following: a lens, an image sensor, a shutter, and a flash. Some embodiments of the image capturing device 104 have different and/or other components than those shown in FIG. 2.

The image capturing device 104 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
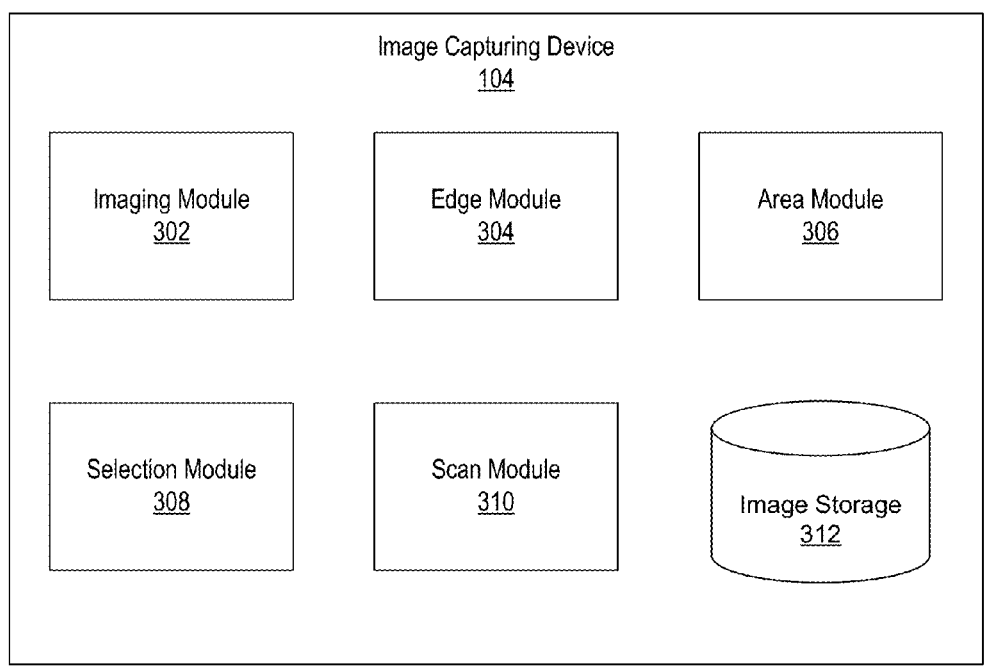
FIG. 3 is a high-level block diagram illustrating modules within an image capturing device according to one embodiment.

FIG. 3 is a high-level block diagram illustrating modules within the image capturing device 104 according to one embodiment. In one embodiment, the modules are within an application program that is executed at the direction of a user of the image capturing device 104. The modules may also be integrated into the operating system of the image capturing device 104. Those of skill in the art will recognize that other embodiments can have different and/or other modules than the ones described here, and that the functionalities can be distributed among the modules in a different manner.

An imaging module 302 manages the operation of the image capturing device 104 to produce corrected images in the corrected perspective. In one embodiment, the imaging module 302 causes the other modules within the image capturing device 104 to process captured images in real-time and continuously updates the corrected image shown by the image capturing device 104 as the device moves about an object.

To this end, the imaging module 302 receives a succession of captured images from the imaging components 216 of the image capturing device 104. The imaging module 302 may include functionality for activating the imaging components 216 and causing the components to provide the images to the imaging module 302. The rate at which the images are received from the imaging components 216 may vary in different embodiments.

In one embodiment, the imaging module 302 scales down the pixel resolution of the captured images in order to enable faster processing by the other modules when producing the corrected images. The imaging module 302 may scale the captured images by a fixed amount (e.g., by 0.5 in each dimension) or to a specified resolution (e.g., 500×300 pixels). In one embodiment, each captured image is scaled down to the same resolution. Images already at the scaled-down resolution need not be further scaled. The scaling may be omitted in some embodiments.

Further, an embodiment of the imaging module 302 stores one or more corrected images in an image storage 312. For example, the imaging module 302 may store a corrected image in the image storage 312 upon receiving a signal from the user of the image capturing device 104. This way, the user can use the image capturing device 104 to view the succession of corrected images produced in real time, and then direct the imaging module 302 to store an optimal corrected image selected from among the viewed images. In one embodiment, upon receiving the signal from the user, the imaging module 302 causes the other modules to perform processing on a non-scaled version of the captured image being displayed when the signal was received. This way, the stored corrected image is at the full resolution of the original captured image, rather than scaled down.

Turning now to the modules that process the captured images to produce corrected images, an edge module 304 receives a captured image of an object from the imaging module 302 and identifies candidate edges of the object in the image. A candidate edge is an edge that has potential to be an edge of the object. For example, if the object in an image is a document, the edge module 304 identifies in the image candidate edges of the four edges of the document. Further, if the left edge of the document is next to the edge of a table, both edges may be identified as candidate edges of the document.

The edge module 304 processes the captured image to enhance the edge-detection process. In one embodiment, the edge module 304 removes noise from the image by applying a smoothing filter that equalizes similar colors in the image. For example, if a color image has multiple pixels that are a similar shade of red, the edge module 304 makes each of the pixels the same red color with the use of the smoothing filter. By removing noise from the image, insignificant changes between pixels are made even more insignificant and significant changes stand out more.

From the noise-reduced image, the edge module 304 identifies pixels in the image that have certain characteristics that indicate the pixels are part of an edge (i.e., identifies edge pixels). In one embodiment, a characteristic that indicates that a pixel is part of an edge is if at least one of the neighboring pixels is drastically different in color from itself. For example, if the pixel is white and a neighboring pixel to the left is black, the pixel may be part of an edge.

In one embodiment, the edge module 304 identifies groups of edge pixels in the image that together form a continuous line in a single direction. The edge module 304 classifies each identified group of pixels as a candidate edge. In one embodiment, an identified group of edge pixels must include at least a threshold number of pixels to be classified as a candidate edge.

The edge module 304 categorizes each candidate edge based on the location of the edge within the image. In one embodiment, each candidate edge is categorized into one of the following categories based on its locations within the image: top edge, bottom edge, left edge, or right edge. To categorize the candidate edges, the edge module 304 creates four independent half areas in the image: a top half, bottom half, right half, and left half of the image.

If a candidate edge is completely within a half, the edge module 304 categorizes the edge into a category that corresponds to the half. In one embodiment, the top edge category corresponds to the top half, the bottom edge category corresponds to the bottom half, the right edge category corresponds to the right half, and the left edge category corresponds to the left edge. For example, if a candidate edge is completely within the top half and partly within the left half and right half, the edge module 304 would categorize the edge as a top edge because it is completely within the top half only.

An area module 306 creates candidate object areas and calculates an object score for each candidate object area. In one embodiment, the area module 306 creates candidate object areas within a captured image based on candidate edges identified and categorized by the edge module 304. A candidate object area is an area within a captured image that could possibly contain the object that a user of the device 104 wishes to see from the corrected perspective.

In one embodiment, to create a candidate object area, the area module 306 selects a candidate edge from each of the four edge categories. If the four selected candidate edges enclose an area, the enclosed area is a candidate object area. In one embodiment, the area module 306 creates as many candidate object areas as possible by making different combinations of candidate edges from the four categories. In another embodiment, the area module 306 creates a candidate object area by selecting a candidate edge from three edge categories. The fourth edge of the candidate area object is assumed based on the orientation and position of the three selected candidate edges.

For each candidate object area created within the image, the area module 306 calculates an object score that indicates a likelihood that the area is the object within the image that a user of the device 104 would like to see from a corrected perspective in a corrected image. The object score of a candidate object area is calculated based on characteristics of the area. In one embodiment, each characteristic contributes a certain number of points to the object score based on whether the candidate object area includes the characteristic. The contributed points, which may be positive or negative, may vary in different embodiments. The area module 306 calculates the object score of a candidate object area based on the number of points contributed by the characteristics.

In one embodiment, a characteristic used in calculating the object score is whether the end portions of the area's candidate edges are each connected to an end of another edge. For example, if each end is connected to an end of another of the area's edges, the characteristic contributes a positive number of points to the object score because typically in an object edges intersect at the end portions. However, if the top edge, for example, extends past the right edge and left edge (i.e., the ends of the top edge are not connected to edges), the characteristic may contribute a negative number of points towards the score. An additional characteristic that may be used in calculating the object score is whether the difference in length between the right edge and left edge is within a specified threshold. In a captured image, the lengths of the right and left edges may not be exactly the same length, but they usually do not differ by a large amount. Similarly, the area module 306 may check whether difference in lengths between the top and bottom edges does not differ by more than a threshold amount.

Other characteristics that may be used is whether the candidate object area is completely enclosed within another candidate object area and whether an angle formed when two edges intersect is less than a certain amount. Typically the area of an object is the most outer candidate area and the angles formed when edges interest are usually within a certain range. Additional characteristics that may be used include the strength of color gradient across the candidate edges' edge pixels and the contiguousness of the candidate edges' edge pixels (e.g., for each candidate edge, the percentage of edge pixels that have similar color gradient strengths and orientations).

A selection module 308 selects objects in images based on candidate object areas identified by the area module 306. In one embodiment, from candidate object areas created and scored by the area module 306 for a captured image, the selection module 308 selects a single candidate object area as being the object within the image that a user wishes to see from the corrected perspective. For example, if a captured image includes a document similar to FIG. 1B, the selection module 308 determines which candidate object area is the document in the image.

To select a candidate object area, the selection module 308 analyzes the object scores calculated by the area module 306 for the candidate object areas of the image. In one embodiment, the selection module 308 selects the candidate object area with the highest object score as being the object in the image.

In another embodiment, the selection module 308 selects a certain number of top scoring candidate object areas in the image. For example, the selection module 308 may select the three candidate object areas that have the highest object scores. Further, the selection module 308 identifies in the image storage 312 at least one image captured by the device 104 prior to the current image (e.g., the captured image immediately preceding the current image). The selection module 308 identifies an object in the prior image. In one embodiment, the selection module 308 identifies an object in the prior image that was displayed from a corrected perspective in a corrected image. In one embodiment, the selection module 308 identifies the object whose candidate object area received the highest object score among other candidate areas in the prior image.

For each selected candidate object area in the current image, the selection module 308 calculates a similarity score which indicates how similar the selected candidate object area is to the object from the prior image. In one embodiment, the selection module 308 calculates the similarity score of a candidate object area based on one or more of the following factors: the difference in size between the candidate object area and prior image's object, how similar in length each candidate edge of the area is to the corresponding edge in the object (e.g., how similar the left edge of the area is to the left edge of the object), the similarity in colors between the candidate area and the object, and the orientation of the area and the object in their respective images.

In one embodiment, to calculate a similarity score of how similar a selected candidate object area is to the object in the prior image, the selection module 308 generates feature vectors for different characteristics of the candidate area. The selection module 308 compares each feature vector of the candidate area to a corresponding feature vector of the object. Based on the similarity between the feature vectors, the selection module 308 calculates the similarity score of the candidate area.

In one embodiment, for each of the selected candidate object areas, the selection module 308 calculates a total score. The selection module 308 calculates the total score of a selected candidate object area based on its object score and similarity score. In one embodiment, the selection module 308 identifies the candidate object area with the highest total score as being the object in the image that a user desires to see from the corrected perspective.

The scan module 310 generates a corrected image based on the captured image. In one embodiment, the scan module 310 identifies a candidate object area of a captured image selected by the selection module 308 as being the object that a user wishes to see from the corrected perspective. The scan module 310 uses the identified candidate object area to generate the corrected image of the object from the corrected perspective. In one embodiment, to generate the corrected image, the scan module 310 performs image perspective transformation on the identified candidate object area to transform the area from being in the captured perspective to being in the corrected perspective. In other words, the candidate object area is rectified to a fronto-parallel plane. The candidate object area in the corrected perspective becomes the corrected image.

In one embodiment, to transform the identified candidate object area to the corrected perspective, the scan module 310 identifies each candidate edge of the candidate object area. For the edge pixels of each candidate edge, the scan module 310 calculates new locations for the pixels in the corrected image so that the edge pixels form the corresponding edge of the corrected image (i.e., a perspective transformation is performed for the edge pixels). For example, for the pixels of the candidate area's top edge, the scan module 310 calculates new locations for the pixels so that they form the top edge of the corrected image. Based on the new locations calculated for the edge pixels, the scan module 310 calculates new locations for the remainder of the area's pixels. The pixels in their new calculated locations form the corrected image.

In one embodiment, the scan module 310 performs additional image processing on the corrected image to improve the quality of the image. To perform image correction, the scan module 310 determines whether the corrected image is in color or black and white. In one embodiment, to determine whether the corrected image is in color or black and white, the scan module 310 analyzes the color saturation of the image's pixels. The scan module 310 calculates an average color saturation of the image's pixels. If the average saturation is above a threshold, the scan module 310 determines that the corrected image is in color. On the other hand, if the average saturation is below the threshold, the scan module 310 determines that the corrected image is in black and white.

In one embodiment, if the corrected image is in color, the scan module 310 performs white balancing on the image to enrich the colors of the image. To perform the white balancing, the scan module 310 analyzes the amount of red, green, and blue of each pixel. For each of the colors (red, green, and blue), if the color value of a pixel is within a certain range, the scan module 310 adjusts the value of the pixel by a certain amount. In other words, the scan module 310 rescales the color values of pixels whose color values falls within a range. For example, if for the color red there is a range between 40 and 220 and a pixel has a red value of 200 (where the maximum is 255), the scan module 310 may increase the red value of the pixel by 30.

In one embodiment, if the corrected image is in black and white, the scan module 310 enhances the black color in the image. In one embodiment, to enhance the black color, the scan module 310 blurs the corrected image. Further, the scan module 310 identifies pixels that are a sharp contrast from those pixels surrounding it. For each identified pixel, the scan module 310 determines the average color value of it surrounding pixels. The scan module 310 subtracts the average color value from the color value of the identified pixel. The scan module 310 sets the color value of the identified pixel to be equal to result of the subtraction. The scan module 310 performs an unsharp masking to reduce the image blurriness.

The scan module 310 displays the corrected image to the user of the image capturing device 104. Since the captured images are being processed in real-time, the user is continuously viewing an object in the corrected perspective through the device 104.

In one embodiment, when the selection module 308 calculates a similarity scores for each selected candidate object area that indicates how similar the area is to an object from a prior image, the selection module 308 determines whether any of the similarity scores are above a specified threshold. If none of the selected candidate object areas have a similarity score above a threshold, the selection module 308 stops the processing of the image and displays the image as captured. In other words, the scan module 310 will neither generate nor display a corrected image based on the captured image. By making sure that at least one similarity score is above the threshold it, assures that there is consistency on what the user is focusing the image capturing device 104 prior to displaying a corrected image.

For example, if the user is panning with the device 104 trying to find within a background a specific object, the user likely does not want to see corrected images of random objects in the background as he is panning. The user will want to see what is currently in the field of view of the device 104 from the perspective of the device 104 so that he can find the object he is looking for. Therefore, by verifying that there is a certain amount of similarity between the current image and the prior image, it assures that a corrected image will be generated when the device 104 is focused on an object that the user is likely interested in seeing from the corrected perspective.

Figure 4:
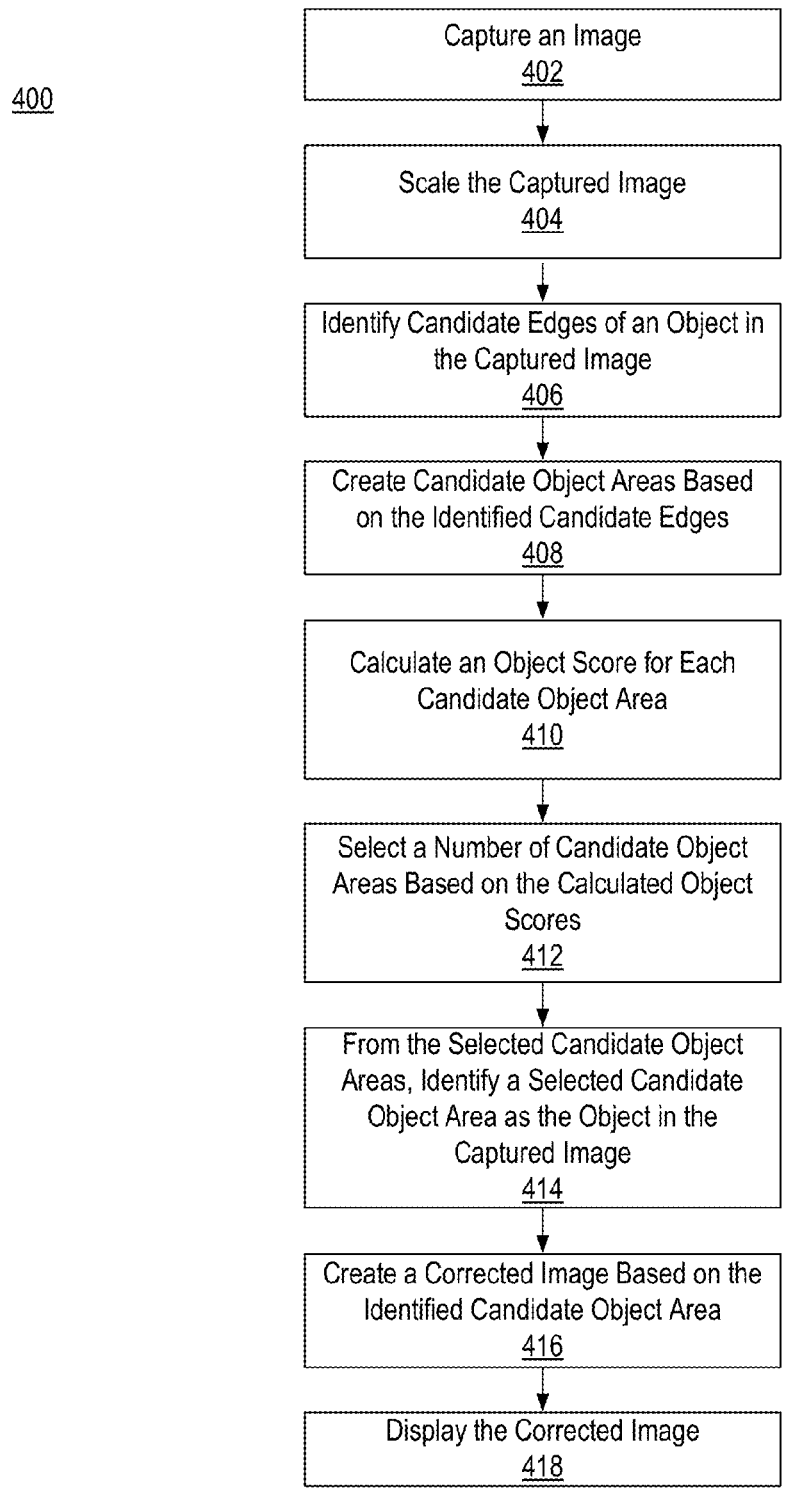
FIG. 4 is a flow chart illustrating the operations of an image capturing device in generating in real-time a corrected image from a corrected perspective according to one embodiment.

FIG. 4 is a flow chart 400 illustrating the operations of the image capturing device 104 in generating in real-time a corrected image from a corrected perspective according to one embodiment. Those of skill in the art will recognize that other embodiments can perform the steps of FIG. 4 in different orders. Moreover, other embodiments can include different and/or additional steps than the ones described here.

The image capturing device 104 captures 402 an image of an object within the field of view of the device 104. The object in the captured image from a captured perspective. The image capturing device 104 scales 404 the captured image and identifies 406 candidate edges in the captured image that may be of the object. Based on the candidate edges, the image capturing device 104 creates 408 candidate object areas. The device 104 calculates 410 an object score for each of the candidate object areas. The object score of a candidate object area indicates a likelihood that the area is the object within the image that a user would like to see from the corrected perspective in a corrected image.

The image capturing device 104 selects 412 a number of the candidate object areas based on the calculated object score. From the selected candidate object areas, the device 104 identifies 414 a selected candidate object area as the object in the captured image that the user is interested in seeing from the corrected perspective. In one embodiment, the device 104 identifies the candidate object area based on a similarity score calculated for each selected candidate object area. The similarity score of a candidate object area indicates how similar the area is to an object from a previously captured image.

The image capturing device 104 creates 416 a corrected image based on the identified candidate object area. The corrected image illustrates the object from the corrected perspective. The image capturing device 104 displays 418 the corrected image to the user. The user can then request to store the corrected image.

Steps described herein as being performed by the image capturing device may be performed by another entity. For example, a remote server communicating with the image capturing device 104 via a network may generate a scanned image based on an image captured by the device 104 and provide the scanned image to the device 104 for displaying.

Some portions of above description present the features of present embodiments in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by real time network operating systems.

The disclosure of the embodiments is intended to be illustrative, but not limiting, of the full scope of the embodiments, which are set forth in the following claims.

The invention claimed is:

1. A method for processing an image, the method comprising:
   automatically capturing, by an image capturing device, a first image including an object from a captured perspective;
   identifying a plurality of candidate edges from the first image;
   creating a plurality of candidate object areas in the first image, each of the plurality of candidate object areas comprised of a different set of candidate edges from the plurality of candidate edges and potentially enclosing the object included in the first image;
   calculating, for each of the plurality of candidate object areas, an object score indicative of a likelihood that the candidate object area represents the object included in the first image;
   selecting, from the plurality of candidate object areas, a number of candidate object areas based on the selected candidate object areas having the highest object scores among the plurality of candidate object areas, the number of selected candidate object areas more than one and less than the plurality of candidate object areas;
   calculating, for each of the selected candidate object areas, a similarity score indicative of a similarity between the selected candidate object area and an object captured in a second image, the second image automatically captured by the image capturing device prior to the first image;
   calculating, for each of the selected candidate object areas, a total score based on the object score and the similarity score calculated for the selected candidate object area;
   identifying, from the selected candidate object areas, a candidate object area as the object included in the first image based on the total score calculated for the identified candidate object area being the highest among the selected candidate object areas;
   generating a corrected image of the object included in the first image based on the identified candidate object area, the corrected image showing the object included in the first image transformed to a corrected perspective; and
   displaying the corrected image.

2. The method of claim 1, further comprising:
categorizing each of the plurality of candidate edges into at least one of a plurality of categories, wherein each of the plurality of candidate object areas is comprised of a single candidate edge from each of the plurality of categories.

3. The method of claim 1, wherein a candidate edge from the plurality of candidate edges is identified by identifying a group of pixels in the first image that have characteristics of being part of an edge and together form a line.

4. The method of claim 2, wherein the plurality of categories comprise a top edge category, a bottom edge category, a right edge category, and a left edge category.

5. The method of claim 1, wherein the object score of a candidate object area from the plurality of candidate object areas is calculated based on at least one of: lengths of the candidate edges from the set of the candidate object area, whether the candidate object area is within an additional candidate object area, angles formed by the candidate edges from the set, strength of color gradient across edge pixels of the candidate edges from the set, contiguousness of edge pixels of the candidate edges from the set, and whether each end portion of a candidate edge included in the candidate object area is connected to an additional end portion.

6. An image capturing device for processing an image, the device comprising:
a processor; and
a non-transitory computer-readable storage medium storing computer-executable instructions which when executed by the processor cause the processor to perform steps comprising:
automatically capturing a first image including an object from a captured perspective;
identifying a plurality of candidate edges from the first image;
creating a plurality of candidate object areas in the first image, each of the plurality of candidate object areas comprised of a different set of candidate edges from the plurality of candidate edges and potentially enclosing the object included in the first image;
calculating, for each of the plurality of candidate object areas, an object score indicative of a likelihood that the candidate object area represents the object included in the first image;
selecting, from the plurality of candidate object areas, a number of candidate object areas based on the selected candidate object areas having the highest object scores among the plurality of candidate object areas, the number of selected candidate object areas more than one and less than the plurality of candidate object areas;
calculating, for each of the selected candidate object areas, a similarity score indicative of a similarity between the selected candidate object area and an object captured in a second image, the second image automatically captured by the image capturing device prior to the first image;
calculating, for each of the selected candidate object areas, a total score based on the object score and the similarity score calculated for the selected candidate object area;
identifying, from the selected candidate object areas, a candidate object area as the object included in the first image based on the total score calculated for the identified candidate object area being the highest among the selected candidate object areas;
generating a corrected image of the object included in the first image based on the identified candidate object area, the corrected image showing the object included in the first image transformed to a corrected perspective; and
displaying the corrected image.

7. The image capturing device of claim 6, wherein the computer-executable instructions further cause the processor to perform steps comprising categorizing each of the plurality of candidate edges into at least one of a plurality of categories, wherein each of the plurality of candidate object areas is comprised of a single candidate edge from each of the plurality of categories.

8. The image capturing device of claim 6, wherein a candidate edge from the plurality of candidate edges is identified by identifying a group of pixels in the first image that have characteristics of being part of an edge and together form a line.

9. The image capturing device of claim 7, wherein the plurality of categories comprise a top edge category, a bottom edge category, a right edge category, and a left edge category.

10. A computer program product stored on a non-transitory computer-readable storage medium having computer-executable instructions which when executed by a processor cause the processor to perform steps comprising:
automatically capturing, by an image capturing device, a first image including an object from a captured perspective;
identifying a plurality of candidate edges from the first image;
creating a plurality of candidate object areas in the first image, each of the plurality of candidate object areas comprised of a different set of candidate edges from the plurality of candidate edges and potentially enclosing the object included in the first image;
calculating, for each of the plurality of candidate object areas, an object score indicative of a likelihood that the candidate object area represents the object included in the first image;
selecting, from the plurality of candidate object areas, a number of candidate object areas based on the selected candidate object areas having the highest object scores among the plurality of candidate object areas, the number of selected candidate object areas more than one and less than the plurality of candidate object areas;
calculating, for each of the selected candidate object areas, a similarity score indicative of a similarity between the selected candidate object area and an object captured in a second image, the second image automatically captured by the image capture device prior to the first image;
calculating, for each of the selected candidate object areas, a total score based on the object score and the similarity score calculated for the selected candidate object area;
identifying, from the selected candidate object areas, a candidate object area as the object included in the first image based on the total score calculated for the identified candidate object area being the highest among the selected candidate object areas;
generating a corrected image of the object included in the first image based on the identified candidate object area, the corrected image showing the object included in the first image transformed to a corrected perspective; and
displaying the corrected image.

11. The computer program product of claim 10, wherein the computer-executable instructions when executed by the processor further cause the processor to perform steps comprising categorizing each of the plurality of candidate edges into at least one of a plurality of categories, wherein each of the plurality of candidate object areas is comprised of a single candidate edge from each of the plurality of categories.

12. The computer program product of claim 10, wherein a candidate edge from the plurality of candidate edges is identified by identifying a group of pixels in the first image that have characteristics of being part of an edge and together form a line.

13. The method of claim 1, wherein the first image is a full resolution image of the object, and wherein the plurality of candidate edges are identified and the plurality of candidate object areas are created from a scaled down version of the first image, and the method further comprising:
 responsive to receiving a request to store the corrected image, generating an additional corrected image of the object using the full resolution image, the additional corrected image showing the object transformed to the corrected perspective; and
 storing the additional corrected image.

* * * * *